United States Patent [19]
Akai et al.

[11] Patent Number: 5,680,290
[45] Date of Patent: Oct. 21, 1997

[54] CAPACITOR HAVING A FUSE AND A WEAK MEMBER

[75] Inventors: Toshifumi Akai, Oyabe; Yutaka Tanaka, Imizu-gun; Toshiyuki Nishimori, Toyama; Hidekazu Wada, Tonami, all of Japan

[73] Assignee: Matsushita Electric Industrial Co., Ltd., Osaka-fu, Japan

[21] Appl. No.: 575,231

[22] Filed: Dec. 20, 1995

[30] Foreign Application Priority Data

Dec. 21, 1994 [JP] Japan .................. 6-317403

[51] Int. Cl.$^6$ .................. H01G 2/16
[52] U.S. Cl. .................. 361/275.4; 361/272; 361/273; 361/274.1; 361/275.2; 361/534
[58] Field of Search .................. 361/272, 273, 361/274.1, 275.1, 275.2, 275.4, 534

[56] References Cited

U.S. PATENT DOCUMENTS

| | | | |
|---|---|---|---|
| 4,433,359 | 2/1984 | Hamabe et al. | 361/273 |
| 4,748,536 | 5/1988 | Robinson | 361/272 |

*Primary Examiner*—Bot L. Ledynh
*Attorney, Agent, or Firm*—Wenderoth Lind & Ponack

[57] ABSTRACT

A capacitor has a capacitor element including a metallized film and a case for hermetically containing the capacitor element. The capacitor element has a protective mechanism for protecting it against insulation breakdown at overvoltage or thermorunaway. The capacitor also has a safety device for keeping the capacitor safe at high internal pressure due to heating. Thus, the protective mechanism and the safety device operate surely, the capacitor is protected under various severe conditions, and the life of the capacitor becomes longer.

25 Claims, 3 Drawing Sheets

CAPACITOR HAVING A FUSE AND A WEAK MEMBER

BACKGROUND OF THE INVENTION

1. Field of the Invention

The present invention relates to a capacitor, and in particular to a capacitor for use in electric equipment.

2. Description of the Prior Art

A capacitor including a metallized film for use in electric equipment such as a washing machine comprises a capacitor element positioned in a casing filled with an insulator such as air, polybutene oil or a resin. The capacitor is required to be reliably used for a long time in electric equipment. The capacitor is also needed to be used safely.

In a prior art capacitor including a metallized film, a capacitor element comprises small metallic electrodes formed on a dielectric film, and a fuse portion is provided in each small electrode as a protective mechanism from insulation breakdown. Thus, the capacitor element can be regarded as a group of small capacitors. When insulation breakdown happens between a pair of opposing small electrodes in the capacitor, the pair of the small electrodes related to the insulation breakdown is electrically separated at the fuse portion thereof from the remainder of the capacitor element, and the protective mechanism prevents insulation breakdown of the other small capacitors. Thus, the life of the capacitor becomes long.

However, when the temperature increases to a high ambient temperature, the space between film layers in the capacitor element in the capacitor becomes narrower, and a start voltage of corona discharge becomes higher. Large insulation breakdown does not occur before high temperature breakdown, and only a breakdown current smaller than a minimum current needed to break the fuse portion flows at the high temperature breakdown. That is, the protective mechanism does not operate normally in this severe condition. Then, at thermal breakdown, the capacitor is heated without stop and thermorunaway happens, so that the capacitor is broken, which is finally accompanied by smoke or fire.

As to breakdown at a portion of the dielectric material in a small capacitor, the protection mechanism operates normally because each small metallic electrode has a fuse. However, the protective mechanism does not protect the capacitor against anomalous contact between an end plane of spiraled metallized film with a sprayed metal formed thereon, and an anomaly of a lead wire connected between the capacitor element and an electrode. Therefore, heating is liable to occur at such anomalous portions, and once heated, thermorunaway happens and the capacitor is broken with accompanying smoke and fire.

In another type of a prior art capacitor including a metallized film, a safety device is provided in the capacitor to prevent destruction of the capacitor when internal pressure increases due to anomalous heating caused by insulation breakdown, overcurrent or the like. For example, a bellows portion is provided in a case to reduce internal pressure. When the internal pressure increases, the bellows portion extends to reduce the internal pressure. Alternatively, a mechanically weak portion is provided to break a lead wire supplying electrical energy to the capacitor element. When the internal pressure in the capacitor case increases, the mechanically weak portion disconnects the capacitor element from the external terminals of the capacitor. Then, power supply to the capacitor is shut off.

In a capacitor having the safety device, insulation breakdown only at a portion in a capacitor element causes insulation breakdown of the entire capacitor chip, and gas generated at the insulation breakdown makes the safety device activated and the function as a capacitor is lost. Thus, the life of the capacitor becomes short. That is, it is not likely that the insulation breakdown remains partial so as to keep the remaining capacitor operating normally. The speed of gas generation depends largely on the dielectric material, applied voltage and temperature. The speed is very high for a capacitor for a high voltage, and the top plate of the case may be blown off from the case due to the high gas pressure. That is the capacitor has low safety. Especially, if the capacitor includes a capacitor element with a resin coating, the gas which has broken the resin expands in the case in a moment, and the top plate tends to be removed.

Further, when the capacitor is used for a long time, if the case has a defect due to rust or the like, the case cannot be hermetically maintained. Then, even when an anomaly happens and the capacitor generates heat, the safety device does not operate normally because the internal pressure does not increase. Then, the capacitor is broken with accompanying smoke or fire.

SUMMARY OF THE INVENTION

An object of the present invention is to provide a capacitor which is safe and has high reliability under severe conditions.

Another object of the present invention is to provide a capacitor having a long life.

A capacitor of the invention comprises a capacitor element comprising a metallized film placed hermetically in a casing. The metallized film comprises metallic electrodes, and each of the metallic electrodes comprises a fuse portion as a protective mechanism. Lead wires connect the capacitor element to two terminals provided at the casing. A safety device of bellows type, shut-off type or the like is provided which breaks the lead wires when internal pressure in the case increases. The safety device protects the capacitor under a high internal pressure due to heating by stopping power supply to the capacitor. The protective mechanism separates a portion of insulation breakdown due to overvoltage from the other portion of the capacitor element. Preferably, an entire surface of the capacitor element is coated with a resin layer. Then, the capacitor element is not subjected to a dangerous state upon insulation breakdown or the like.

An advantage of the present invention is that the capacitor has higher reliability under severe conditions of insulation breakdown and thermorunaway.

Another advantage of the present invention is that the capacitor has a longer life.

A third advantage of the present invention is that the capacitor is safe at a high temperature.

BRIEF DESCRIPTION OF THE DRAWINGS

These and other objects and features of the present invention will become clear from the following description taken in conjunction with the preferred embodiments thereof and with reference to the accompanying drawings, and in which.

DETAILED DESCRIPTION OF THE PREFERRED EMBODIMENTS

Figure 1:
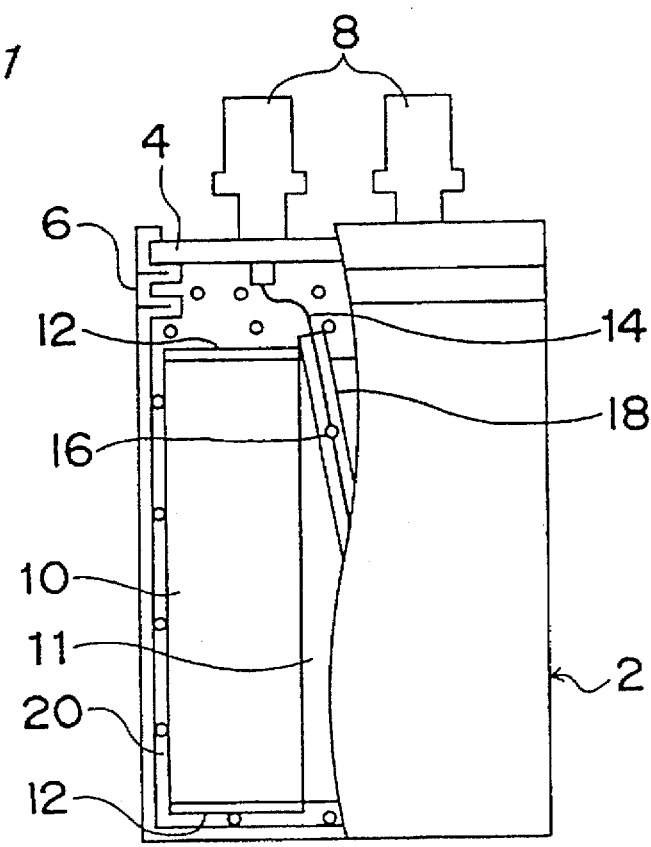
FIG. 1 is a partially sectional, elevational view of a capacitor having a safety device of a bellows type.

Referring now to the drawings, wherein like reference characters designate like or corresponding parts throughout the several views, FIG. 1 shows a capacitor of an embodiment of the invention having a bellows type safety device. A case 2 and a top plate 4 comprise a hermetic casing, and the case 2 has a bellows section 6 near the top plate. Two external terminals 8 are provided at the top plate 4. A capacitor element 10 spiraled around a core 11 is put in the casing (only a half of the element is shown for clarity). The capacitor element 10 has metal-sprayed layers 12 at two ends thereof, and lead wires 14 are connected between external terminals 8 and the metal-sprayed layers 12. The lead wire 14 has a mechanically weak portion 16 which comprises, for example, a lead wire having a flat section different from a circular section of the lead wire 14. When an internal pressure in the hermetic casing is increased, the bellows portion 6 is elongated and the mechanically weak portions 14 are broken to separate the external terminals 8 from the capacitor element 10 to prevent the supply of electrical energy. That is, the bellows portion 6 and the mechanically weak portion 16 operate as a safety device. The lead wires 14 including the mechanically weak portion 16 are passed through an insulating tube 18 to protect it from anomalous contact with the metal-sprayed layers 12. Polybutene oil 20 is filled in the casing 2, 4. The capacitor fabricated as mentioned above has a rating of 200 V and 60 µF. The capacitor is referred to as capacitor A.

Figure 2A:
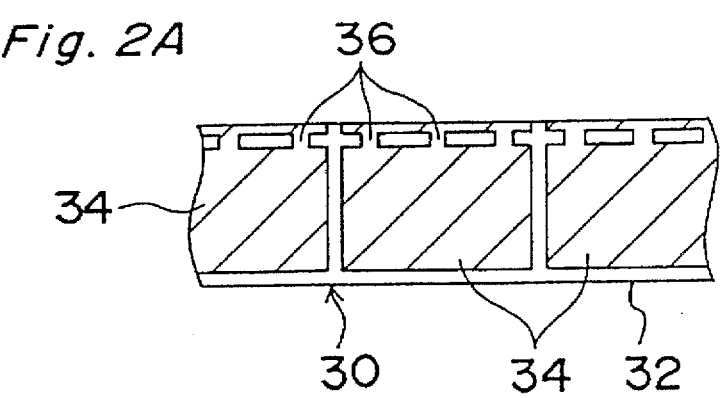
FIGS. 2A and 2B are a top plan view and a bottom plan view of a part of a metallized film.
Figure 2B:
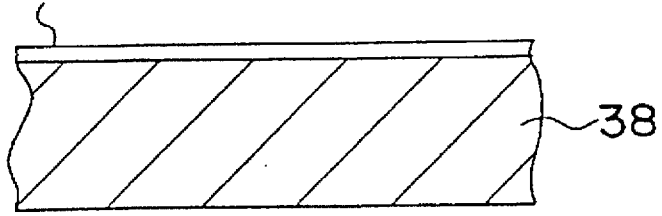

The capacitor element 10 comprises a metallized film 30. As shown in FIG. 2A, a deposition metallic film made of aluminum is formed at a side of a polyethylene telephthalate film 32 and is divided into a plurality of small electrodes 34. Each divided electrode 34 has a pattern as shown in FIG. 2 having narrow fuse portions 36 near an end of the film 32, and they play the role of a protective mechanism. The electrodes 34 are not formed near the other end of the film 32. As shown in FIG. 2B, a deposition metallic film 38 made of aluminum is also formed at the other side of the film 32. This film and another polypropylene film (not shown) are spiraled. Then, a metal such as zinc is sprayed on two sides of the spiraled capacitor element 10 to form metal-sprayed layers 12, and lead wires 14 are connected thereto after heating for aging. Thus, the capacitor comprises a group of small capacitors.

Next, a comparison example (referred to as capacitor B) having the same protective mechanism is fabricated similarly to the capacitor A of the embodiment except that the capacitor element is positioned in a resin case instead of the case 2 having the bellows portion, and the resin case is filled with an epoxy resin. The capacitor B does not comprise a bellows type safety device. Further, another comparison example (referred to as capacitor C) is fabricated similarly except that the protective mechanism or fuse portions is not provided, but includes the above-mentioned safety device.

Figure 3:
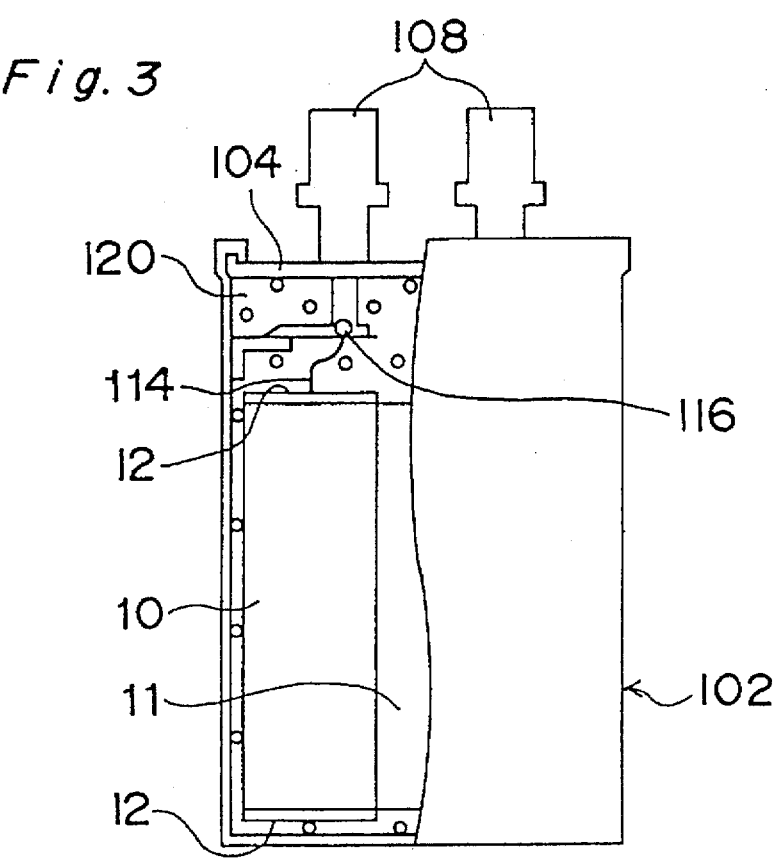
FIG. 3 is a partially sectional, elevational view of a capacitor having a safety device of shut-off type.

In a second embodiment of the invention, a capacitor element 10 fabricated in the above-mentioned embodiment is positioned in a casing having a shut-off type safety device as shown in FIG. 3. As shown in FIG. 3, a case 102 and a top plate 104 comprise a hermetic casing. Two external terminal 108 are provided at the top plate 104. The capacitor element 10 is put in the case 102 (only a half thereof is shown for clarity). The capacitor element 10 has metal-sprayed layers 12 at two ends thereof. Lead wires 114 are connected between external terminals 108 and the metal-sprayed layers 12, and a connection portion of the lead wire 114 to the terminal 108 is provided as a mechanically weak portion 116. When an internal pressure in the casing is increased due to over-voltage or the like, the top plate 104 is moved outside to open the mechanically weak portion 116 to separate the external terminals 108 from the capacitor element 10 to prevent supply of electrical energy. That is, the top plate 104 and the mechanically weak portion 116 operate as a shut-off type safety device. Polybutene oil 120 is filled in the casing 102, 104. The capacitor fabricated as mentioned above has a rating of 200 V and 60 µF. The capacitor is referred to as capacitor A.

Further, a comparison example (referred to as capacitor C) is fabricated similarly, except that the protective mechanism is not provided, but includes the above-mentioned safety device. (A comparison example, having the same protective mechanism and fabricated similarly to the capacitor A of the embodiment except that the capacitor element is positioned in a resin case, is not fabricated in this embodiment because it corresponds to the capacitor B of the first embodiment. Capacitors B are not fabricated in some embodiments explained below for the same reason.)

In a third embodiment of the invention, the capacitor element fabricated in the above-mentioned first embodiment comprising a metallized film is entirely coated with an epoxy resin, and it is positioned in the case having the bellows type safety device as shown in FIG. 1, and a polybutene oil is filled therein. The capacitor fabricated as mentioned above has a rating of 200 V and 60 µF.

Next, a comparison example (referred to as capacitor B) having the same protective mechanism is fabricated similarly to the capacitor A of the first embodiment except that the capacitor element is positioned in a resin case (nit shown) without the bellows type safety device and that the case is filled with an epoxy resin. Further, another comparison example (referred to as capacitor C) is fabricated similarly except that the protective mechanism is not provided, but it includes the bellows type safety device.

In a fourth embodiment of the invention, the capacitor element fabricated in the above-mentioned second embodiment having a metallized film is coated with an epoxy resin entirely, and it is positioned in the case having a shut-off type safety device as shown in FIG. 3, and polybutene oil is filled therein. The capacitor fabricated as mentioned above has a rating of 200 V and 60 µF. The capacitor is referred to as capacitor A.

Next, a comparison example (referred to as capacitor B) having the same protective mechanism is fabricated Similarly to the capacitor A of the second embodiment except that the capacitor element is positioned in a resin case without the shut-off type safety device instead of the case 102 and that the case is filled with an epoxy resin. Further, another comparison example (referred to as capacitor C) is fabricated similarly except that the protective mechanism is not provided, but it includes the shut-off type safety device shown in FIG. 3.

Figure 4:
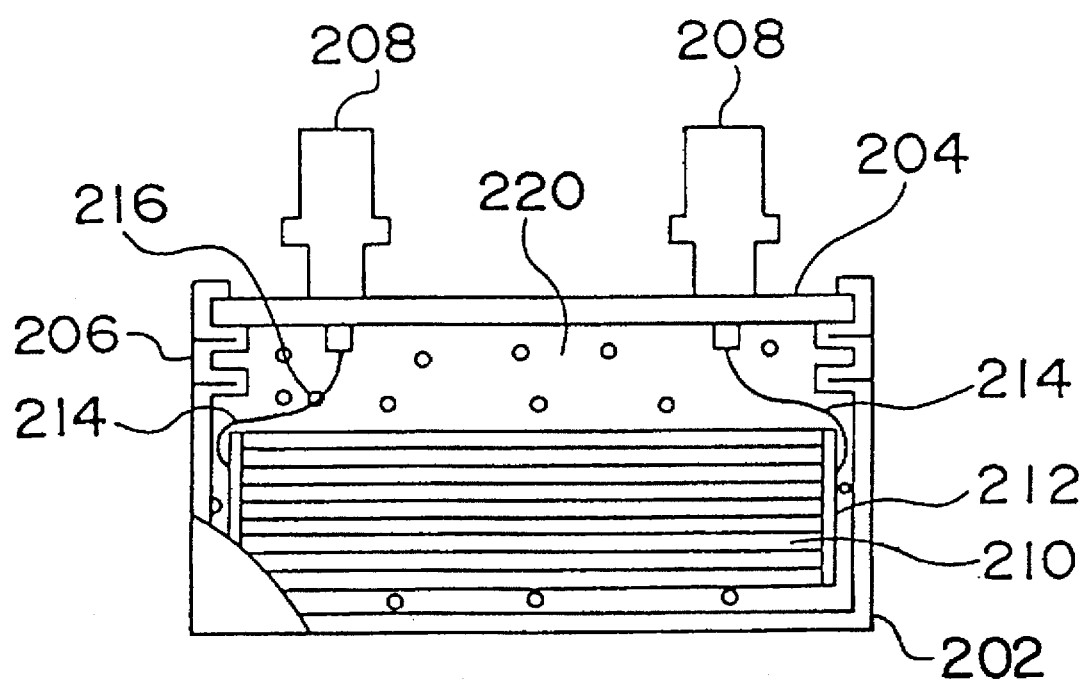
FIG. 4 is a partially sectional, elevational view of a capacitor having a safety device of the bellows type.

In a fifth embodiment of the invention, a capacitor comprises multi layer type capacitor elements 210 (FIG. 4). The multi layer type capacitor elements 210 are fabricated in a known way. Deposition films of aluminum are formed at both sides of a polyethylene telephthalate film, and the deposition films formed at one of the sides has a pattern comprising segments of electrodes and having fuses portions similar to those 36 as shown in FIG. 2A as a protective mechanism. The film and another polypropylene film are layered to have a cylindrical shape. Then, it is cut into rings, and each of them is sprayed with a metal onto two sides thereof, and they are heated for aging. They are cut further to form capacitor elements 210, and lead wires 214 are connected thereto. Next, the multi layer type capacitor element 210 is positioned in a casing comprising a case 202 having a bellows type safety device 206 and a top plate 204 with terminals 208, and polybutene oil 220 is filled therein. The capacitor fabricated as mentioned above has a rating of 200 V and 60 µF, and it is referred to as capacitor A.

Next, a comparison example (referred to as capacitor B) having the same protective mechanism is fabricated similarly to the capacitor A of the fifth embodiment except that the capacitor element 210 is positioned in a resin case instead of the case 202 and the case is filled with an epoxy resin. The capacitor B does not comprise a bellows type safety device. Further, another comparison example (referred to as capacitor C) is fabricated similarly except that the protective mechanism is not provided, but it includes the bellows type safety device.

In a sixth embodiment of the invention, the capacitor element 210 fabricated in the above-mentioned fifth embodiment having a metallized film is positioned in a case having a shut-off type safety device as shown in FIG. 3, and polybutene oil is filled therein. The capacitor fabricated as mentioned above has a rating of 200 V and 60 µF.

Further, a comparison example (referred to as capacitor C) is fabricated similarly except that the protective mechanism is not provided, but it includes the shut-off type safety device.

Figure 5:
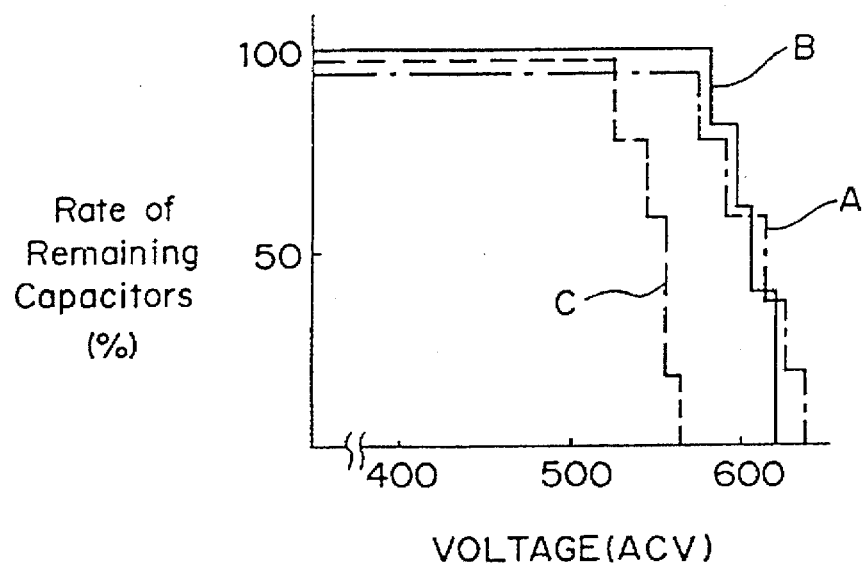
FIG. 5 is a graph of the result of overvoltage tests of capacitors A of a first embodiment of the invention, capacitors B as a comparison example and capacitors C as another comparison example.

In a seventh embodiment of the invention, the capacitor element 210 fabricated in the above-mentioned fifth embodiment having a metallized film is entirely coated with an epoxy resin, and it is positioned in the case having a bellows type safety device shown in FIG. 5, and polybutene oil is filled therein. The capacitor fabricated as mentioned above has a rating of 200 V and 60 µF.

Next, a comparison example (referred to as capacitor B) having the same protective mechanism is fabricated similarly to the capacitor A of the fifth embodiment except that the capacitor element is positioned in a resin case without the bellows type safety device and the case is filled with an epoxy resin. Further, another comparison example (referred to as capacitor C) is fabricated similarly except that the protective mechanism is not provided, but it includes the bellows type safety device.

In an eighth embodiment of the invention, the capacitor element 210 fabricated in the above-mentioned fifth embodiment having a metallized film is coated with an epoxy resin entirely, and they are positioned in the case having the shut-off type safety device as shown in FIG. 3, and polybutene oil is filled therein. The capacitor fabricated as mentioned above has a rating of 200 V and 60 µF.

Next, a comparison example (referred to as capacitor B) having the same protective mechanism is fabricated similarly to the capacitor A of the fifth embodiment except that the capacitor element is positioned in a resin case without a shut-off type safety device and the case is filled with an epoxy resin. Further, another comparison example (referred to as capacitor C) is fabricated similarly except that the protective mechanism is not provided, but it includes the shut-off type safety device.

Forced breakdown at an applied overvoltage is tested on the capacitors A and comparison capacitors B and C of the above-mentioned embodiments in a maximum rated temperature of +30° C. under an elevated alternating voltage. As a representative example, FIG. 5 shows a result on ten samples of the capacitors A of the first embodiment and ten comparison 5 examples of each of the capacitors B and C for the first embodiment. The abscissa represents alternating voltage applied to the capacitor, and the ordinate represents a ratio of capacitors remained not broken.

When the voltage is increased near 600 V, all the capacitors B having the protective mechanism with no safety device are broken accompanied with smoke because they are liable to be broken thermally. On the other hand, the capacitors A having the protective mechanism and the safety device of the bellows type and of the shut-off type of the invention remain without breakdown at a higher voltage. They are also broken, but without smoke due to the safety device. The comparison capacitors C having only the safety device are also broken, but without smoke because the safety device is used. The ratio of capacitors remaining that are not broken of the capacitors A is much larger than that of the comparison capacitors C having only the safety device. This is ascribed to the fact that even if insulation breakdown occurs at a pair of electrodes, it remains locally due to the protective mechanism for the capacitors A, while the entire capacitor of the comparison capacitors C is broken due to the safety device.

Tests are performed at various temperatures on the three types of capacitors A, B and C for the eight embodiments. Table 1 shows a result on ten samples the capacitors A of the first embodiment and ten comparison examples of each of the capacitors B and C for the first embodiment. The data in Table 1 means a number of capacitors remain normal at test vs. the number of capacitors tested. At room temperature, all the capacitors operate normally, as expected. On the other hand, at high temperature (+30° C.), the seven capacitors B having only the protective mechanism among ten are broken accompanied with smoke, while the capacitors A and C remain normal without breakdown. However, the safety device of the capacitors C does not operate if the case has a defect so as not to keep the casing hermetic, or all the capacitors C are broken. On the contrary, the capacitors A having the protective mechanism and the safety device operate normally at high temperatures and in a case having a defect.

TABLE 1

| | Test results | | |
|---|---|---|---|
| | Room temperature | High Temperature | Case with defect |
| Capacitor B | 10/10 | 3/10 | — |
| Capacitor C | 10/10 | 10/10 | 0/10 |
| Capacitor A | 10/10 | 10/10 | 10/10 |

NB. The data in Table 1 means a number of normal capacitors/a number of capacitors tested.

As explained above, the capacitors of the invention are more safe for overvoltage and thermorunaway because they have the protective mechanism and the safety device simultaneously, and synergistic advantages are observed. Even when a protective mechanism does not operate at a high ambient temperature or when breakdown occurs due to heating at the sprayed-metal layer, a power supply to the capacitor can be shut off due to an increase in internal pressure because the capacitor element is positioned in a case having a safety device. Thus, the capacitor is not broken with smoke or fire.

Further, because the capacitor element comprises the protective mechanism, the capacitance decreases only due to insulation breakdown of one small capacitor, and the life of the capacitor can be lengthened without thermal breakdown of the entire capacitor.

Even when the case has a defect after it has been used for a long time and it cannot be kept sealed, the capacitor has a long life because of the protective mechanism including small divided electrodes.

The speed of gas generation is slow because insulation breakdown occurs at a small portion between a pair of small electrodes, while disconnecting the remaining part of the capacitor element electrically. Thus, a sharp increase in internal pressure in the casing can be prevented. Therefore, even if the capacitor is broken, it does not accompany fire or smoke.

If the entire capacitor element is covered with a thermosetting resin, the capacitor does not become dangerous upon insulation breakdown.

In the above-mentioned embodiments, the capacitor element comprises a metallized film of polyethylene telephthalate film and a polypropylene film. However, one of polycarbonate film, a polystyrene film, a polyethylene, paper and the like or a combination thereof may be used instead of polyethylene telephthalate film and polypropylene film. In the embodiment, both sides of the polyethylene telephthalate film are deposited with metal. However, a film may comprises a deposited metallic layer only on a side, and a pair of such films may be layer for capacitance. The metal to be deposited on a film may be zinc instead of aluminum. The capacitor element comprising a metallized film may be hardened with an urethane resin instead of epoxy resin. The capacitor element may have any form such as tubular, rectangular or flatness type. Though polybutene oil or epoxy resin is filled in the casing in the embodiments, the capacitor elements may be enclosed in a casing with air therein.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A capacitor comprising:
   a capacitor element comprising a metallized film comprising metallic electrodes, each of said metallic electrodes comprising a fuse portion;
   lead wires connected to said capacitor element;
   a casing hermetically containing said capacitor element therein, said casing comprising two terminals that are connected to said lead wires; and
   a safety device structured to break said lead wires when internal pressure in said casing increases.

2. The capacitor of claim 1, wherein said safety device comprises a mechanically weak member connected between one of said two terminals and one of said lead wires and a casing part that is outwardly movable relative to the inside of said casing when internal pressure in said casing increases.

3. The capacitor of claim 2, and further comprising a resin layer coating the entire surface of said capacitor element.

4. The capacitor of claim 1, wherein said safety device comprises a mechanically weak portion provided in said lead wires and a bellows portion that forms a part of said casing.

5. The capacitor of claim 4, and further comprising a resin layer coating the entire surface of said capacitor element.

6. The capacitor of claim 1, and further comprising a resin layer coating the entire surface of said capacitor element.

7. The capacitor of claim 6, and further comprising a resin layer coating the entire surface of said capacitor element.

8. The capacitor of claim 6, and further comprising polybutene filled in said casing having said capacitor element therein.

9. The capacitor of claim 1, wherein said capacitor element is a spiral capacitor element.

10. The capacitor of claim 1, wherein said capacitor element is a multilayer capacitor element.

11. The capacitor of claim 1, wherein said metallized film comprises a film having metallic films formed on both sides thereof, and at least one of said metallic films comprises a plurality of said metallic electrodes.

12. The capacitor of claim 1, wherein said metallized film comprises a dielectric film having a metallic film deposited on one side thereof forming said metallic electrodes each comprising a said fuse portion.

13. The capacitor of claim 1, wherein said metallic electrodes are made of aluminum.

14. The capacitor of claim 1, wherein said metallic electrodes are made of zinc.

15. The capacitor of claim 1, wherein said capacitor is of a type selected from the group consisting of tubular type capacitors and flatness type capacitors.

16. The capacitor of claim 1, and further comprising polybutene filled in said casing having said capacitor element therein.

17. The capacitor of claim 1, and further comprising air filled in said casing having said capacitor element therein.

18. A capacitor comprising:
   a capacitor element comprising a metallized film comprising metallic electrodes, each of said metallic electrodes comprising a fuse portion;
   an external casing having an interior space hermetically containing said capacitor element, said external casing comprising an outwardly movable external casing part movable outwardly relative to said interior space in response to an increase in internal pressure in said interior space and two terminals, at least one of said two terminals being mounted on said outwardly movable part;
   lead wires connected to said two terminals and to said capacitor element; and
   a safety device forming a part of a conducting path of said at least one of said two terminals structured to break said conducting path in response to outward movement of said outwardly movable external casing part.

19. A capacitor comprising:
   a capacitor element comprising a metallized film comprising metallic electrodes, each of said metallic electrodes comprising a fuse portion;
   an external casing having an interior space hermetically containing said capacitor element, said external casing comprising an outwardly movable external casing part movable outwardly relative to said interior space in response to an increase in internal pressure in said interior space and two terminals, at least one of said two terminals being mounted on said outwardly movable part;

lead wires connected to said two terminals and to said capacitor element, whereby a conducting path is formed between said capacitor element and each of said two terminals; and a mechanically weak part located in said conducting path of said at least one of said two terminals that is mechanically weaker than said lead wire of said conducting path of said at least one of said two terminals.

20. The capacitor of claim 19, wherein said mechanically weak part comprises a part of said lead wire of said conducting path of said at least one of said two terminals that varies in cross section.

21. The capacitor of claim 20, wherein said part of lead wire of said conducting path of said at least one of said two terminals that varies in cross section comprises a flat section that is flat relative to a circular cross section of said lead wire of said conducting path of said at least one of said two terminals.

22. The capacitor of claim 19, wherein said mechanically weak portion comprises a part of said lead wire of said conducting path of said at least one of said two terminals.

23. The capacitor of claim 22, wherein said capacitor element comprises metal layers and said lead wire of said conducting path of said at least one of said two terminals is located in an insulating tube protecting said lead wire of said conducting path of said at least one of said two terminals from anomalous contact with said metal layer of said capacitor element.

24. The capacitor of claim 22, wherein said outwardly movable external casing part of said external casing comprises a bellows portion that expands in response to an increase in internal pressure in said casing.

25. The capacitor of claim 19, wherein said outwardly movable external casing part of said external casing comprises a top plate and said mechanically weak portion comprises a connection portion connecting said lead wire of said conducting path of said at least one of said two terminals to said at least one of said two terminals.

* * * * *